UNITED STATES PATENT OFFICE.

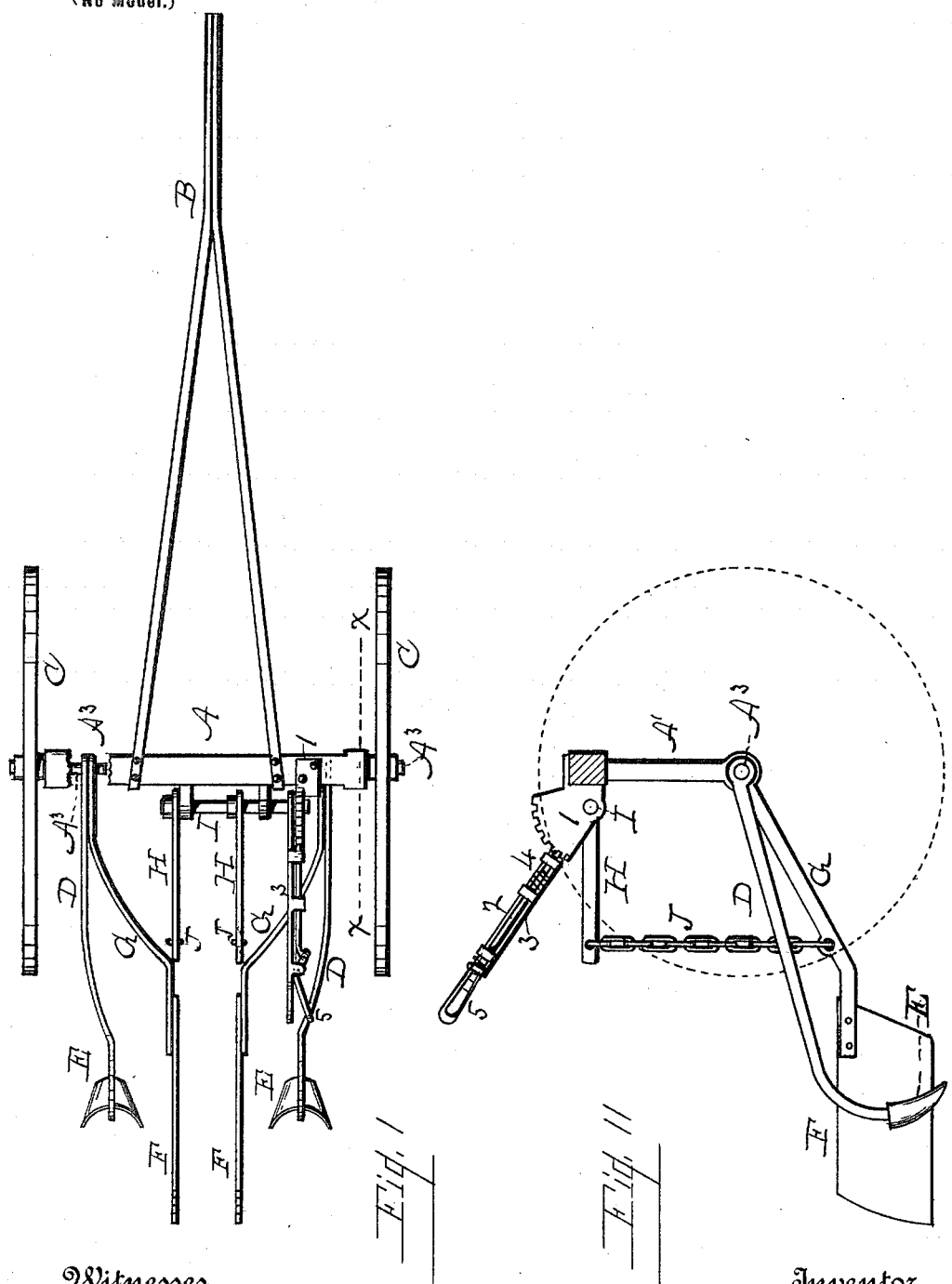

GEORGE L. CORNELL, OF FERRY, OHIO.

ADJUSTABLE FENDER FOR CULTIVATORS.

SPECIFICATION forming part of Letters Patent No. 626,222, dated June 6, 1899.

Application filed April 13, 1898. Serial No. 677,460. (No model.)

*To all whom it may concern:*

Be it known that I, GEORGE L. CORNELL, a citizen of the United States, residing at Ferry, in the county of Greene and State of Ohio, have invented certain new and useful Improvements in Adjustable Fenders for Cultivators; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in adjustable fenders for cultivators, the features of which will be fully hereinafter described and claimed.

My invention consists in suspending the fenders from arms pivoted on a shaft held in bearings attached to the axle and a hand-lever attached to said shaft, with rack and catch to hold said fenders in any desirable position in relation to the soil and operated independently of the plow-beams and dependent shovels.

The object of my invention is to hold the fenders at different altitudes, and thereby adapt the same to the uneven growth in the rows of corn.

The object is accomplished by the mechanism illustrated in the accompanying drawings, in which—

Figure 1 is a plan of a cultivator with the adjusting device attached. Fig. 2 is a partial side view with a part in section on line *x* of Fig. 1.

Like letters designate like parts in the two views.

My device is adapted to straddle-row cultivators whether of single or gangs of shovels, the attachment being to the spindles and axle, and the fenders are in no wise different from those in use. The exhibit of the cultivator is only to show the relation of the several parts.

The axle A has arms A' extending downward and in which are held the spindles A³ to which the ground-wheels C C are pivoted. B is the tongue; but the parts to which the team is hitched are omitted. To the inner end of the spindles are pivoted the drag-bars D D, to which the shovels E E are attached. The arms or drag-bars G G are likewise pivoted to the spindles, and to these arms are rigidly attached the fenders F F. In bearings on the rear surface of the axle is held the shaft I. To this shaft are rigidly attached the arms H H, nearly on a line with the fenders. The chains J connect the rear ends of these arms with the drag-bars carrying the fenders.

The fenders as usually attached to cultivators are set to protect the growing plant from being covered by the action of the shovels and are held for the time in a fixed position. When the corn is low, the fenders are bolted in a low position, and when the corn is higher they are raised to another fixed position. Now as the growth of the plant is not uniform the fenders should be adapted to the changes in growth that the weeds may be uniformly covered. This is the operation of my device, and therefore saves much labor in the use of a hoe.

The hand-lever, with its engaging rod and rack, is an old device, and to lock this hand-lever a pawl or pin could be readily substituted.

Having fully described my invention, what I claim, and desire to secure by Letters Patent, is—

1. In combination with a straddle-row cultivator the shaft or spindle A³ held in bearings of the axle, the supporting-arms H H held rigidly to shaft I, the drag-bars G G held on the spindles, the fenders attached to said drag-bars, the chains connecting the supporting arms and drag-bars, the hand-lever with engaging rod rigidly attached to said shaft and the rack fastened to said axle, substantially as described.

2. In combination with a straddle-row cultivator the shaft or spindle A³ held in bearings of the axle, the supporting-arms held rigidly to shaft I, the drag-bars, the fenders attached to said drag-bars, the chains connecting the arms and drag-bars, and the hand-lever with suitable means to lock the same in position, substantially as described.

In testimony that I claim the foregoing as my own I affix my signature in presence of two witnesses.

GEORGE L. CORNELL.

Witnesses:
B. PICKERING,
E. J. FINKE.